United States Patent [19]
Mikiya

[11] 3,760,842
[45] Sept. 25, 1973

[54] PRESSURE MANIFOLD HAVING PLURALITY OF QUICK CONNECT-DISCONNECT PLUGS FOR SELECTIVELY RECEIVING PRESSURE METER, DRAIN COCK, ETC.

[76] Inventor: Toshio Mikiya, 17-10, 1 chome, Ikegami, Ota-ku, Tokyo, Japan

[22] Filed: Nov. 22, 1971

[21] Appl. No.: 200,901

[30] Foreign Application Priority Data
Dec. 29, 1970 Japan ..... 45/133325 (utility model)
Jan. 22, 1971 Japan ................................. 46/1909

[52] U.S. Cl. .................. 137/557, 137/561, 285/155, 285/156
[51] Int. Cl. ........................................... F16k 37/00
[58] Field of Search .................. 285/150, 151, 152, 285/155, 156; 137/557, 561, 559, 606, 608

[56] References Cited
UNITED STATES PATENTS

| | | | |
|---|---|---|---|
| 1,797,591 | 3/1931 | Sartakoff | 137/557 |
| 2,529,605 | 11/1950 | Gustafson | 137/557 X |
| 3,633,618 | 1/1972 | Blackmore | 137/557 X |
| 2,783,775 | 3/1957 | Fullwood | 251/294 X |
| 1,452,779 | 4/1933 | Barry | 285/151 X |
| 2,342,757 | 2/1944 | Roser | 285/151 X |
| 2,645,244 | 7/1953 | Klickman | 137/561 R |
| 2,935,338 | 5/1960 | Mills | 251/149.5 |
| 3,103,942 | 9/1963 | Sharp | 137/561 R X |

*Primary Examiner*—Henry T. Klinksiek
*Attorney*—Robert D. Flynn et al.

[57] ABSTRACT

A manifold for diverting compressed air supplied via pipes in communication with a compressor, to various air tools, connected with pressure meter, drain cocks and pipes for air tools, if necessary, by connectors.

8 Claims, 6 Drawing Figures

3,760,842

PRESSURE MANIFOLD HAVING PLURALITY OF QUICK CONNECT-DISCONNECT PLUGS FOR SELECTIVELY RECEIVING PRESSURE METER, DRAIN COCK, ETC.

BACKGROUND OF THE INVENTION

Generally, manifolds are used to divert compressed air supplied via pipes in communication with a compressor to various kinds of air tools, and various kinds of manifolds have been developed. In the prior types of manifold, there is provided a pressure meter mounted on a compressor. It was not possible to learn how much pressure the manifold received from the compressed air coming from the compressor and how much pressure it sent to various air tools in the form of compressed air. It was particularly necessary to learn accurately the pressure at the end of pipes when several air tools are used at the same time and the pressure in the whole pipe line decreases. The present invention aims to obviate the above mentioned problems.

SUMMARY OF THE INVENTION

An object of the present invention is to provide a manifold with a through longitudinal hollow therein and a plurality of holes in communication with the hollow, on the open ends of which are mounted fittings via which pipes for air tools and/or drain cocks and a pressure meter are removably provided.

It is another object of the present invention to provide a manifold with improved holes and improved fittings by;

a. enabling that even if the manifold based on the present invention is located far from a compressor with a pipe in communication therewith, compressed air is supplied to a plurality of air tools with equal pressure connected thereto, b. enabling to measure the pressure precisely and readily at a remote end far from the compressor, c. enabling to exhaust impurities and drains in the manifold and supplying pipes and tubes of compressed air with one drain cock, eliminating the prior art many drain cocks that have been necessary, and d. enabling to communicate the manifold with the compressor and the manifold with the various air tools respectively selecting the shortest cut by pipes and hoses.

Still other objects and features of the present invention will be more clear and concrete when taken in accordance with the following description and accompanying drawings illustrating preferred embodiments of the present invention.

BRIEF DESCRIPTION OF THE DRAWING

In the drawings parts denoted by the same numeral denote the same or the corresponding parts.

DESCRIPTION OF PREFERRED EMBODIMENTS

Figure 1:
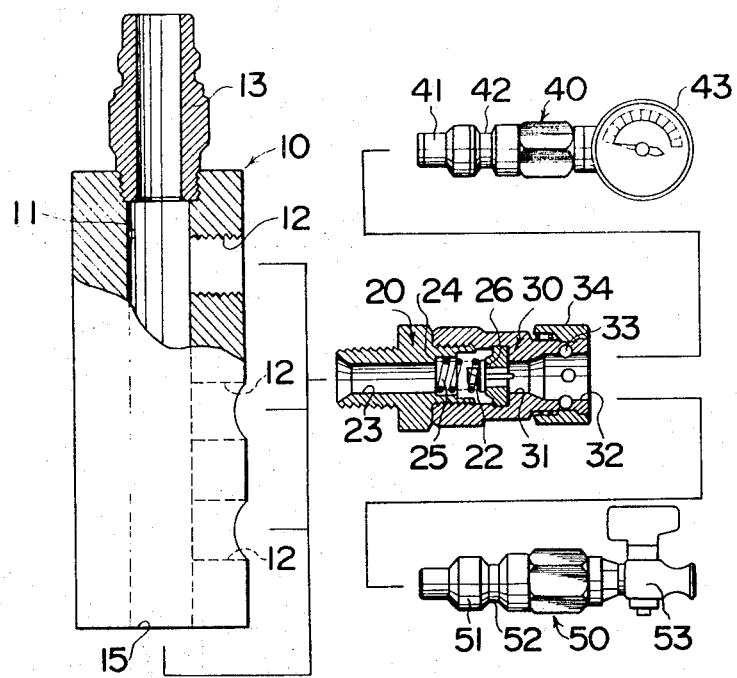
FIG. 1 is a perspective view of an embodiment of a manifold in accordance with the present invention.

As shown in FIG. 1, a manifold of the present invention comprises, a manifold body 10, plugs 20, fittings 30, a pressure meter 40 which is removably provided on the manifold 10 via fittings 30, and a drain cock 50 which is also removably provided.

Figure 2:
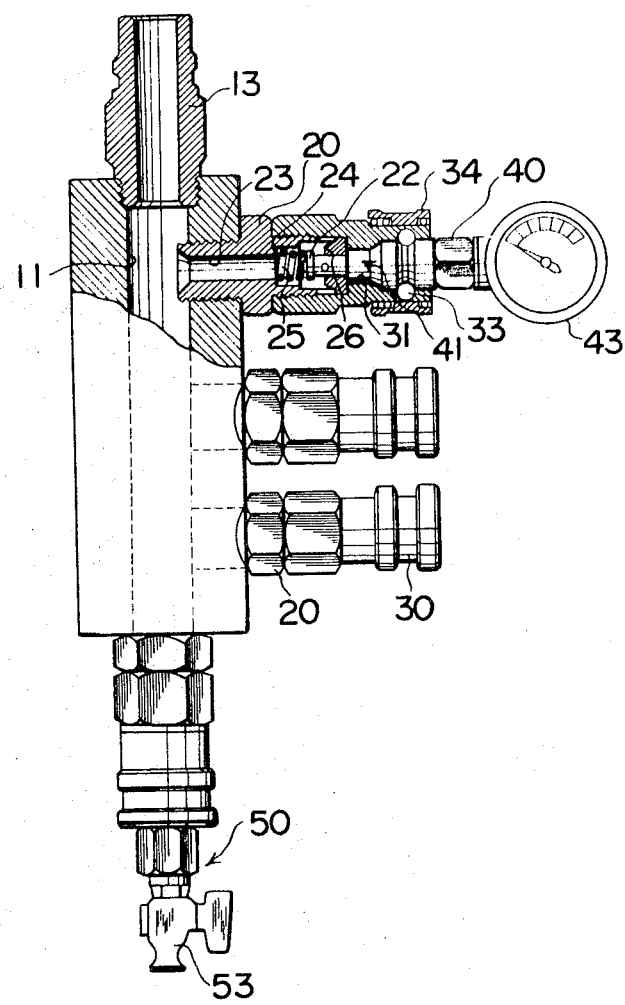
FIG. 2 is a front view of another embodiment with drain cocks and a pressure gauge in accordance with the present invention.
Figure 3:
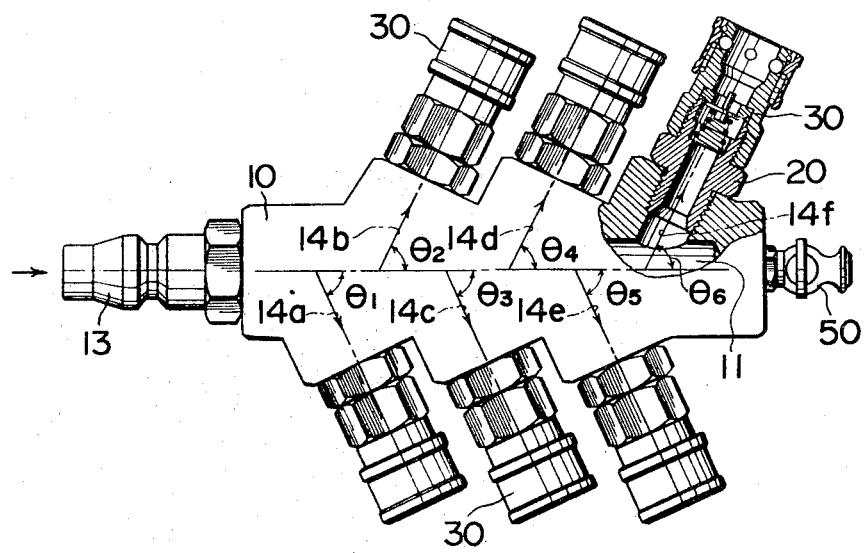
FIG. 3 is a front view with partially cut section of a deformed embodiment with diverting holes which is connected thereto with a regulated angle.
Figure 5:
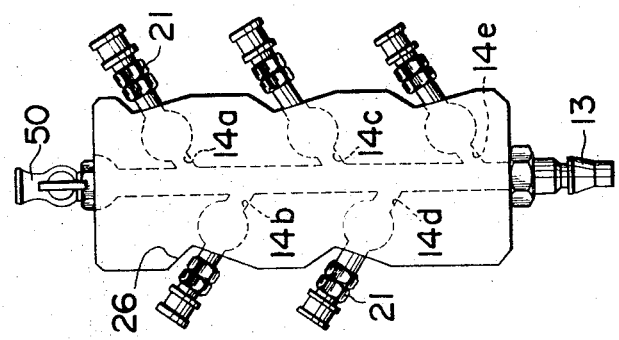
FIGS. 4 and 5 are front views of modified embodiments with different connections of fittings such as plugs in accordance with present invention.
Figure 4:
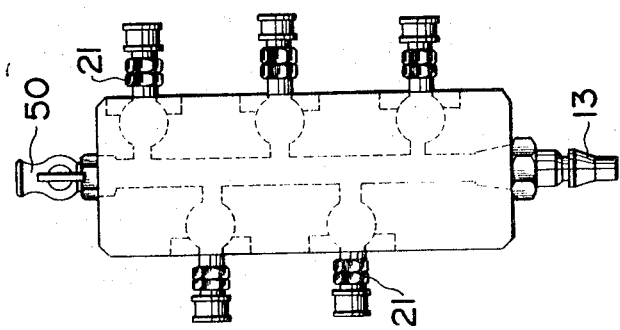

The manifold body 10 is provided with a longitudinal through hollow 11 from which are diverted a plurality of holes, at one end of which (in the drawings it is at the upper portion) is screwed a pipe joint 13 which is connected to a pipe in communication with a compressor (not shown in the drawings) and at the other end of which is usually mounted a drain cock 50 as is explained in the following description (Refer to FIG. 2). Drain cock 50 may be mounted on an open end of the diverted holes 12, when the other end of the longitudinal through hollow is mounted with an adequate plug. The holes 12 from the through hollow 11 may be diverted in different fashion. Those shown in FIGS. 1, 2 and 4 are diverted at an angle of 90° in respect of the through hollow 11. On the contrary the diverted holes 14 in FIGS. 3 and 5 are diverted with an angle smaller than 90°. The reason for this is to reduce the fluid resistance. The embodiment shown in FIG. 3 will now be described in detail.

Referring to FIG. 3 to the through hollow 11 in the manifold body 10 are connected a plurality of diverting holes $14a - 14b$ positioned on both sides of the hollow 11 alternately and having $\theta_1° - \theta_6°$ angles in respect of the hollow respectively. These angles are arranged in such a way that an angle at the front is bigger than that at the rear (FIG. 3, from left to right). That is to say, each $\theta$ is in the following relation; $R > \phi_1 > \phi_2 > \phi_3 > \phi_4 > \phi_5 > \phi_6$. Thus, turbulent flows that usually occur at the diverting portion do not appear and the flow is very smooth, and the compressed air becomes a laminar flow to be diverted with less loss of energy. As the diverting part is oval shaped, it is larger than the cross section thereof if the holes were attached rectangularly to the hollow. This will let much more fluid through the oval area than through the areas shown in FIGS. 1, 2 and 4, and the loss of fluid energy becomes less corresponding to the smothness in flow and the occurence of turbulent flows becomes less as well. The connecting angles $\theta_1 - \theta_6$ are made smaller in inverse proportion to the inner resistance. For example, when compressed air is supplied to the first diverting hole 14a in spite of the high pressure in the through hollow, as the connecting angle $\theta_1$ is larger than the connecting angle $\theta_6$, the inner resistance in the vicinity of the diverting hole 14a becomes larger than that in the other diverted hole 14f. The fluid energy of the compressed air is reduced in response to the said inner resistance and the laminar flow with a little lower pressure than that in the through hollow enters into the diverted hole 14a. On the other hand, at the diverted portion of the diverted hole 14f, the fluid energy loss is less than that at the diverted portion of the diverted hole 14a. Therefore, in spite of the fact that the fluid energy in the through hollow becomes low as the fluid goes through the hollow from the front portion to the rear portion, the same laminar flow as that in the diverted flow 14a is obtained in this diverted hole 14f. As a result, homogeneous equal pressure compressed air is always supplied to every one of plural air tools respectively.

Figure 6:
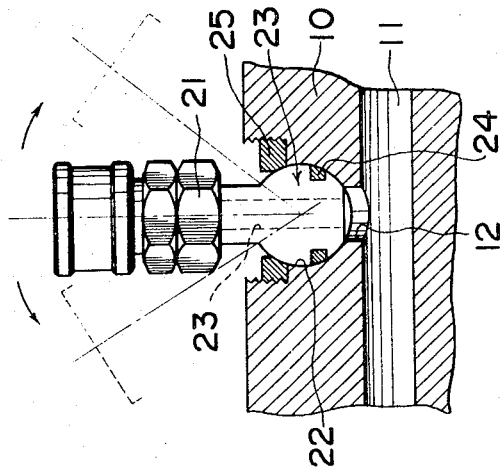
FIG. 6 is an enlarged view of the connecting parts of the plugs in FIG. 4.

A plug 20 which is mounted on the opening portions of the diverted holes 12, 14 and/or at the other end 15 of the through hole 11 is explained in the following description. One of the features of the present invention lies in the combination of a manifold body with a pressure meter and a drain cock which readily connected and disconnected, as needed. So, as shown in the drawing, through the use of the plug 20 and the joint 30, the pressure meter 40 and the drain cock 50 are mounted readily and securely on the manifold body by merely thrusting and pushing. The plugs 20 in FIGS. 1, 2 and 3 are of rigid type and are only screwed to the open ends of the diverted holes in the manifold body and of the other end of the through hollow. On the other hand, the plugs 21 in FIGS. 4, 5 and 6 are rotatable relative to the manifold body 10 and the tip end thereof may be freely turned to any direction, or is a movable type. Plugs may be mounted differently, but this embodiment discloses plugs mounted by universal type joints. Naturally a jointing method is not limited to the universal type joint, and the type called 'ball and socket joint' may be applicable. These plugs 21 are movably received in the recess 22 in the manifold body 10 by the spherical part 23 at the root portion thereof, and around the spherical part 23 is set a sealing 24 and at the opening end of a recess 22 is applied a stopper nut 25, thus regulating the motion of the plug 21 in a predetermined region. As shown in FIG. 5, when the diverted holes 14a – 14e are mounted with the plugs 21 which are inclined relative to the through hollow, the recesses 26 are provided at each open end of the holes in the side of the manifold body. The plugs are movable as required in a cone shape region. Therefore, pipes and hoses extending from air tools or other portions may take the shortest cut and pipes and hoses to be used are of the length of the shortest distance and excessive loads are not applied to pipes and hoses during operation, thereby improving the operational efficiency.

The above plugs 20, 21 are used with a socket joint 30 as if in one body. Inside the plug is set a valve 22 which operates in response to a pressure gauge or a drain cock insertion and is put in a hole 31 provided inside socket joint 30. On the shoulder portion 24 formed in a hole 23 of the plugs 20, 21 is mounted a spring 25 imparting a constant pressure to the valve 22. Around the outer periphery of an opening 32 at the end of the socket joint 30 are provided several balls 33 with an adequate interval therebetween and is mounted a sleeve 34 which moves to the left and right in the drawing (FIG. 1) to influence the movement of the balls 33. At the each base portion of the pressure meter 40 and the drain cock 50 removably inserted in the socket joint 30 are rigidly set plugs 41 and 51 respectively. Plugs 41 and 51 are provided with respective recesses 42, 52 for engaging the balls 33 in the socket joint. A through hollow (not shown in the drawing) in the plug is in communication with the pressure meter 43 and the drain cock body 53. In FIG. 2 is shown the state where a drain cock 50 and the pressure meter are mounted removably on the socket joint 30, the former at the end of the through hollow in the manifold body, and the latter on the socket joint 30 at the diverting holes. When the pressure meter and the drain cock are inserted into an opening 32 of the socket joint respectively, a plurality of balls 33 are engaged to the recesses 42, 52. By moving the sleeve 34 to left or right in the drawing (FIG. 2) the engaging balls are dislocated slightly toward the center of a circle or outwardly, thereby facilitating an insertion and tightening of the pressure meter and the drain cock. The tip ends of the pressure meter and the drain cock are brought into contact with the valve 22 set in the plugs 20, 21 and push the valve 22 back from the valve seat 26 against the spring 25, letting the compressed air enter. When the pressure meter and the drain cock are released from the socket joint, the valve 22 and the valve seat 26 are brought into a tight contact, preventing the compressed air from entering and leaking out. As explained above, the pressure meter being removably mounted on an any of the diverted holes, the pressure at the end of the compressor pipes, or in other words, the pressure at the nearest portion for an air tool, may be measured precisely and readily. The compressed air may be applied to the air tool under an adequate pressure condition, thereby facilitating various efficient operations. Although the embodiments shown in the drawing show a valve set in the plug 20, it should be clear that the valve may be mounted in a socket joint.

What is claimed is:

1. A manifold for coupling a source of pressure to a plurality of output means which selectively include output utilization devices, a pressure meter and a drain cock, comprising:

a manifold body having a longitudinal through hollow therein and a plurality of diverted holes therein which are in communication with said longitudinal through hollow;

a pipe joint at one end of the longitudinal through hollow for coupling said manifold to a source of pressure; and a plurality of quick connect and disconnect plug means mounted at least on each opening end of said diverted holes, each of said plug means being provided with a through hole therein and having a valve therein which closes said through hole when said plug means has no output means connected thereto;

each of said plug means being adapted to selectively receive one of said output means in a quick connect-disconnect manner and said valve means being responsive to connection of an output means to a respective plug means for opening and allowing communication between said longitudinal through hollow and said outut means.

2. A manifold as claimed in claim 1, wherein said plurality of diverted holes are at an inclined angle relative to the longitudinal through hollow such that the supplied pressure to said diverted holes is substantially equal.

3. A manifold as claimed in claim 2, wherein said plurality of diverted holes are arranged on opposite sides of the longitudinal through hollow alternately at an angle relative to the longitudinal through hollow, said diverted holes being so arranged that the angle at the front is larger than that at the rear, said angles having values such that the supplied pressure to the diverted holes is equal.

4. A manifold as claimed in claim 1 wherein at least one of said plugs is rotatably attached to said manifold body so as to enable changing the direction of the output tip end thereof.

5. A manifold as claimed in claim 1 comprising one of said quick connect and disconnect plug means at the end of the longitudinal through hollow of said manifold which is opposite said one end thereof.

6. A manifold as claimed in claim 1 wherein each of said plug means is adapted to selectively receive at least one of a pressure meter and a drain cock in said quick connect-disconnect manner.

7. A manifold for coupling a source of pressure to at least one of a plurality of output means, comprising:
  a manifold body having a longitudinal through hollow therein and a plurality of diverted holes therein which are in communication with said longitudinal through hollow, said plurality of diverted holes being arranged along the length of said longitudinal through hollow and at an inclined angle relative to the longitudinal through hollow with the angle of inclination of the front diverted hole being larger than the angle of inclination of the rear diverted hole, said angles having values such that the supplied pressure to the diverted holes is substantially equal;
  connection means for coupling an output means to said diverted holes.

8. A manifold as claimed in claim 7 wherein said diverted holes are arranged alternately on opposite sides of the longitudinal through hollow.

* * * * *